(12) United States Patent
Nolan, III

(10) Patent No.: US 9,630,304 B1
(45) Date of Patent: Apr. 25, 2017

(54) COMPRESSOR MOUNTING ASSEMBLY

(71) Applicant: Lightning Investigations LLC, Louisville, KY (US)

(72) Inventor: Robert A. Nolan, III, Louisville, KY (US)

(73) Assignee: Donan Solutions, LLC, Louisville, KY (US)

( * ) Notice: Subject to any disclaimer, the term of this patent is extended or adjusted under 35 U.S.C. 154(b) by 293 days.

(21) Appl. No.: 13/654,076

(22) Filed: Oct. 17, 2012

(51) Int. Cl.
  *B25B 27/14* (2006.01)
  *E21B 7/02* (2006.01)

(52) U.S. Cl.
  CPC ............... *B25B 27/14* (2013.01); *E21B 7/02* (2013.01)

(58) Field of Classification Search
  USPC ............ 29/281.1, 281.4, 281.6; 144/286.1, 144/286.5, 287; 173/184, 185
  See application file for complete search history.

(56) References Cited

U.S. PATENT DOCUMENTS

| | | | |
|---|---|---|---|
| 5,082,037 A * | 1/1992 | Hammons et al. | 144/286.5 |
| 5,267,748 A | 12/1993 | Curran | |
| 5,397,147 A | 3/1995 | Ducharme et al. | |
| 5,752,639 A | 5/1998 | Rice | |
| 5,775,560 A | 7/1998 | Zahn et al. | |
| D407,135 S | 3/1999 | DeWitt | |
| 5,890,739 A | 4/1999 | Cogswell, Sr. | |
| 6,129,371 A | 10/2000 | Powell | |
| 6,173,705 B1 | 1/2001 | DeWitt | |
| 6,484,987 B2 | 11/2002 | Weaver | |
| 6,871,440 B2 * | 3/2005 | Highfill | F41J 9/18 42/90 |
| 7,240,707 B1 | 7/2007 | Schweitzer | |
| 7,408,526 B2 | 8/2008 | Pan | |
| 7,591,404 B2 | 9/2009 | LeDuc et al. | |
| 7,828,076 B1 | 11/2010 | Hurley | |
| 7,954,777 B2 | 6/2011 | Bohm et al. | |
| 7,971,840 B2 | 7/2011 | Hirschhorn | |
| 7,987,923 B1 | 8/2011 | Hurley | |
| 8,020,824 B2 | 9/2011 | Pan | |
| 2002/0084396 A1 | 7/2002 | Weaver | |
| 2003/0057244 A1 | 3/2003 | Dorety | |
| 2003/0205599 A1 | 11/2003 | Brown | |
| 2005/0025651 A1 | 2/2005 | Sowa et al. | |
| 2005/0263659 A1 | 12/2005 | Pfister et al. | |
| 2008/0061097 A1 | 3/2008 | Milender et al. | |
| 2008/0231029 A1 | 9/2008 | Hummel | |
| 2009/0140538 A1 | 6/2009 | Larson | |

* cited by examiner

*Primary Examiner* — Richard Chang
(74) *Attorney, Agent, or Firm* — Middleton Reutlinger

(57) ABSTRACT

A compressor mounting assembly that supports a variety of compressors and may be adapted to attach to a vehicle is disclosed herein. The compressor mounting assembly may contain structure that allows pivoting, rotation, and vertical adjustment to facilitate on-site testing, inspection, and/or manipulation of the compressor.

19 Claims, 3 Drawing Sheets

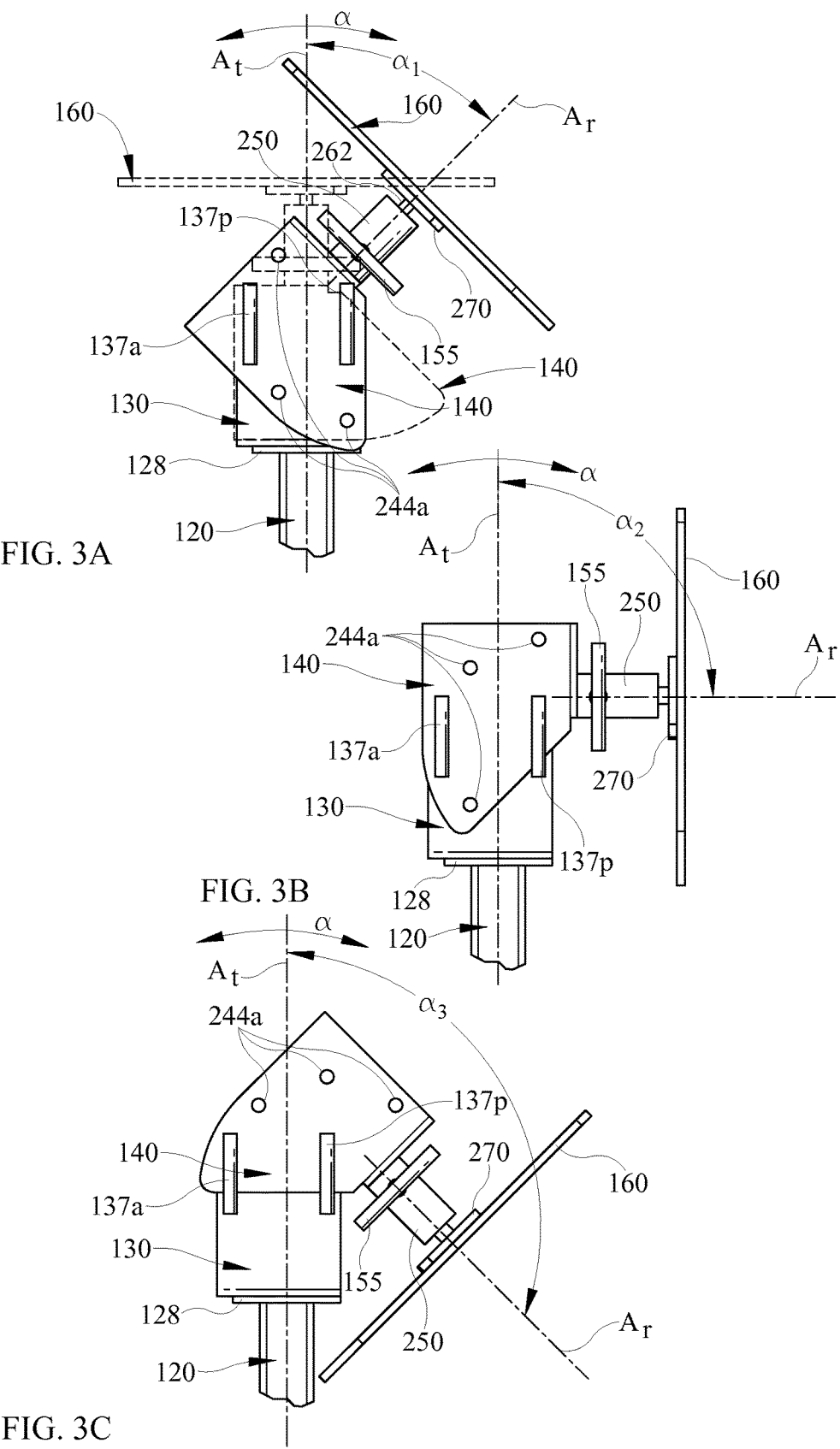

COMPRESSOR MOUNTING ASSEMBLY

FIELD OF INVENTION

The present invention is related generally to compressor mounting assemblies and more specifically to compressor mounting assemblies that may be mounted to a hitch of, for example, a vehicle such as a truck or van, and may be angularly and/or linearly adjustable to facilitate manipulation of a compressor or similar device.

DESCRIPTION OF RELATED ART

Various mounting assemblies have been proposed in the art, some of which are hitch mountable. There is a need, however, for a compressor mounting assembly capable of supporting a compressor that may be utilized in the field. Compressors may be quite heavy and thus not easy to manipulate by a human operator. One way to address this need is to provide a compressor mounting assembly that is capable of being mounted to a vehicle's hitch. Due to the various terrain features that may be encountered in the field, as well as the ergonomic variations between operators, there is a need for some adjustability of the location and/or orientation of the compressor or other equipment being manipulated in order to increase operator comfort and decrease fatigue, likelihood of injury, physical impairment, and the like. For instance, the vehicle with the compressor mounting assembly may be parked or otherwise located on an incline or decline or other inclement terrain. Further, human operators may be of various heights and body types.

Additionally, existing methods of manipulating a compressor are laborious. These existing methods often involve transporting a compressor to an off-site lab or similar location for inspection, testing, and manipulation. Subsequently, the compressor may be transported back to the site from which it was extracted. The existing methods may also entail extra logistics arising from the need to manage multiple compressors that may be extracted from a variety of locations, moved to a lab or similar location, separated into component parts, and then may be re-assembled and returned to the site from which it was extracted. Thus, the existing methods may result in an inefficient use of time and resources.

SUMMARY OF THE INVENTION

The present invention allows an operator in the field to readily inspect and test a compressor or similar unit on site without the need to transport the compressor to a separate testing location. However, compressors can be heavy, rendering manipulation and operation in the field by the operator difficult or impractical. Thus, it is one object of the present embodiment to facilitate testing and inspection of the compressor by providing a compressor mounting assembly upon which a compressor may be mounted. It is a further object of the present embodiment to provide for vertical and/or angular adjustability of the compressor mounting assembly. In this way, a compressor may be raised, lowered, and/or angularly rotated, and/or pivoted to meet the ergonomic needs of the operator.

Therefore, a general object of this invention is to provide a compressor mounting assembly upon which a compressor or the like may easily be mounted, inspected, tested, otherwise manipulated, and/or dismounted.

An additional object of this invention is to provide a mechanism through which an operator in the field may adjust the height of the compressor mounting assembly and/or a mechanism through which an operator may rotate a mounting surface of the compressor mounting assembly about an axis, thereby allowing an operator to account for his or her own physical characteristics as well as the environmental factors present so that the operator can ergonomically inspect, test, and manipulate the compressor.

Other objects and advantages of this invention will become apparent from the following description taken in connection with the accompanying drawings, wherein some embodiments of this invention are set forth by way of illustration and examples.

BRIEF DESCRIPTION OF THE DRAWINGS

FIG. 3A is a side view of a portion of the compressor mounting assembly of FIG. 1, with an embodiment of a mounting plate pivoted to one possible or first pivotal position, with a horizontal or another position of the mounting plate shown in broken lines;

FIG. 3B is a side view of a portion of the compressor mounting assembly of FIG. 1, with the mounting plate pivoted to a second or another pivotal position;

FIG. 3C is a side view of a portion of the compressor mounting assembly of FIG. 1, with the mounting plate pivoted to a second or another pivotal position.

DETAILED DESCRIPTION

Figure 1:
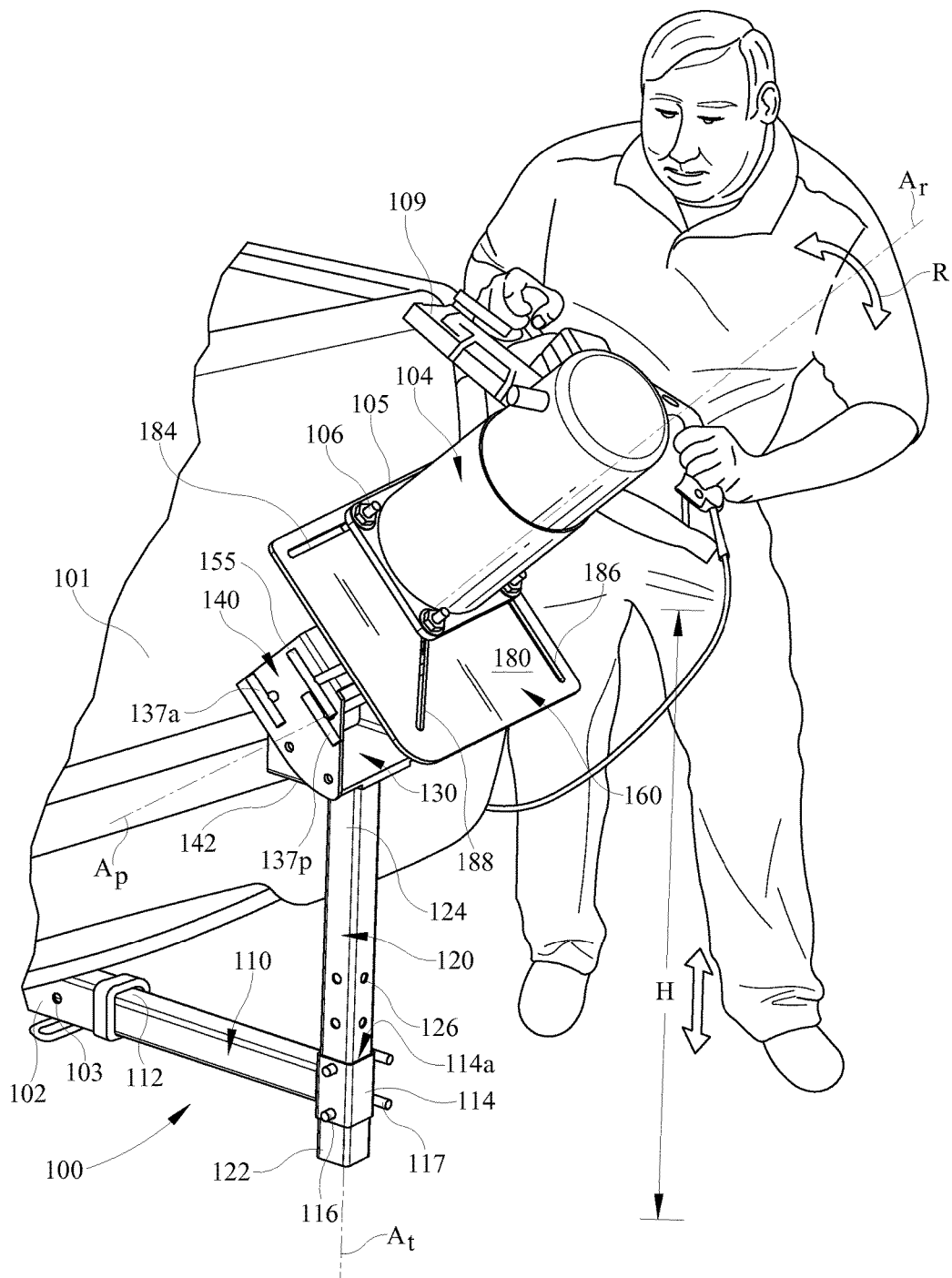
FIG. 1 is a perspective view of an embodiment of a compressor mounting assembly, with portions of the vehicle broken away.

Referring to FIGS. 1-3C, an embodiment of a compressor mounting assembly or framework 100 is illustrated having an end adapted to mate to a hitch 102 or similar device of a vehicle 101. In this way, vehicle hitch 102 or the like may be used to help support compressor mounting assembly 100 and thereby support and/or stabilize a compressor 104 when mounted on compressor mounting assembly 100. Another end of compressor mounting assembly 100 may be adapted to mate with mounting plate 160, which in turn may be adapted to accept and/or attach to compressor 104. The compressor mounting assembly 100 may include components that allow for vertical adjustability substantially along a transverse axis At. The framework may also include components that allow the mounting plate to rotate about a rotational axis Ar. Similarly, the framework may include components that allow the mounting plate to pivotally rotate about a pivotal axis Ap.

Figure 2:
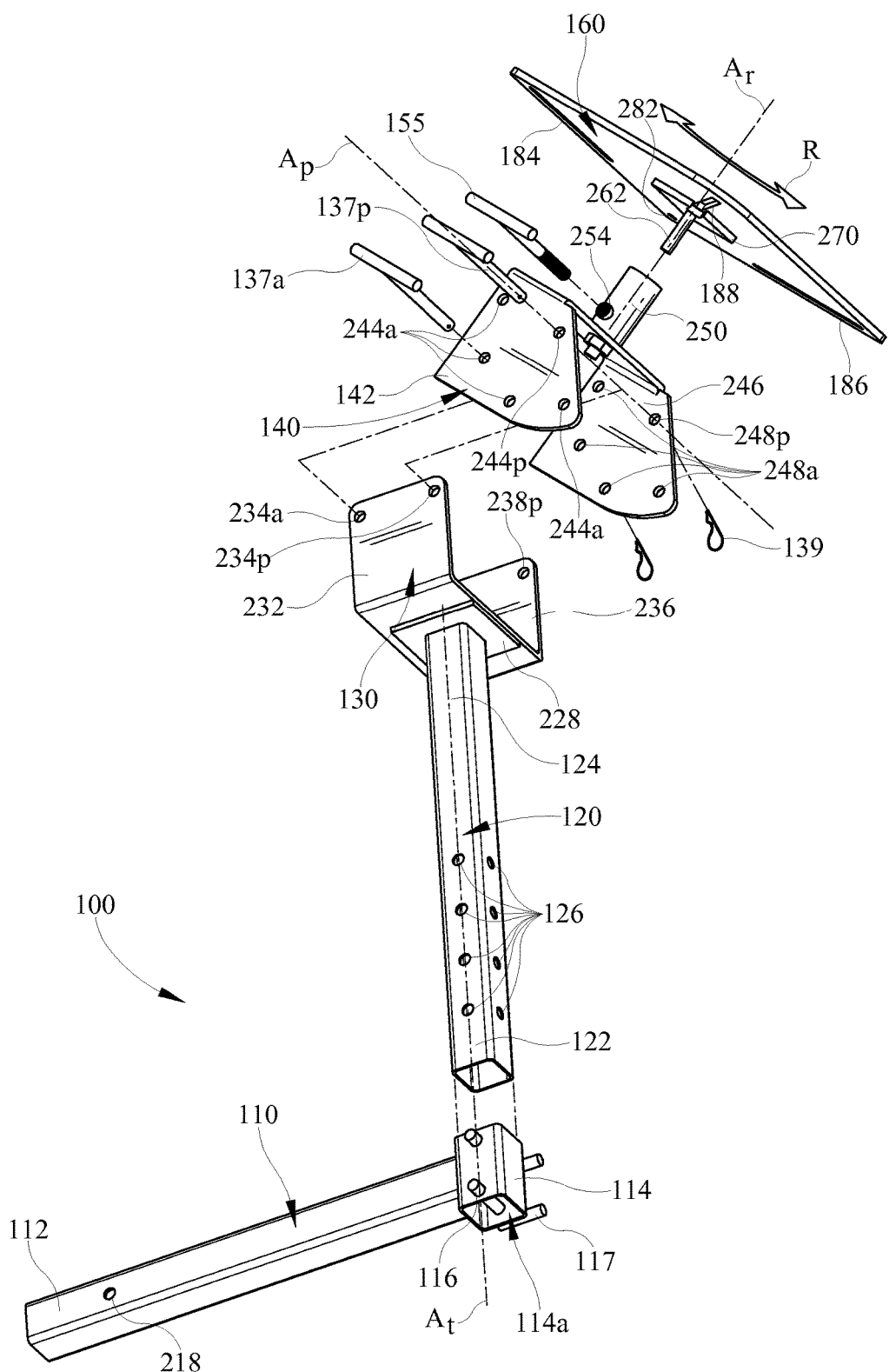
FIG. 2 is a perspective exploded view of the compressor mounting assembly of FIG. 1.

Referring now to FIGS. 1 and 2, an embodiment of a compressor mounting assembly 100 is illustrated. This embodiment of compressor mounting assembly 100 includes an extension member 110, a transverse member 120, a lower pivot member 130, an upper pivot member 140, and a compressor mounting plate or member 160, which may be utilized to support, for example, compressor 104 or other object, such as an HVAC compressor. In this embodiment, extension member 110 has a proximal end 112 and a distal end 114. Extension member proximal end 112 is adapted to extend from vehicle 101. More specifically, in this embodiment, extension member proximal end 112 is adapted to extend from hitch 102 of vehicle 101. Extension member 110 is inserted into hitch 102 and may be secured by inserting an object (not shown), such as a hitch pin or rod, through hitch 102 via a hitch pin hole 103 and through extension member 110 via a corresponding hitch pin hole 218. FIG. 1 also illustrates transverse member 120 having a proximal end 122 and a distal end 124. At least a portion of transverse member 120 located at or near transverse member proximal end 122 is of a size and shape to be inserted in and/or through an opening 114a in extension member distal end 114. Lower pivot member 130 is attached to, or integral with, transverse member 120, at or near transverse member distal end 124. As shown in FIGS. 3A-3C, lower pivot member 130 is pivotally attached to upper pivot member 140 to allow upper pivot member 140 to be pivoted relative to lower pivot member 130 to a variety of angular positions. The upper pivot member 140 is secured in each angular position by one or more rods, more specifically, a pivot rod 137p and an arc rod 137a. Mounting plate 160 is attached to upper pivot member 140. Mounting plate 160 has an attachment protrusion 262 that is inserted into a mounting plate receiving member 250. Mounting plate receiving member 250 is attached to, or integral with, upper pivot member 140. As discussed in more detail below, attachment protrusion 262 is secured to mounting plate receiving member 250 by a threaded rod 155. A foot 105 of compressor 104 is releasably attached to mounting plate 160 by one or more bolts 106.

As shown in FIGS. 1 and 2, extension member 110 is a substantially square tube having rounded corners. Extension member 110 has a substantially consistent cross-section along its length and is adapted to attach to hitch 102. It is understood that extension member 110 may be a variety of shapes, including, but not limited to: square, round, cylindrical, triangular, rectangular, hexagonal, octagonal, otherwise polygonal; or prismatic or any other shape; and it need not be tubular. Having rounded corners may be desirable to facilitate insertion of extension member proximal end 112 into hitch 102, but rounded corners may not be necessary for all types of hitches and in some circumstances it may even be desirable to not have rounded corners. It may be desirable to have extension member 110 be hollow to lower material cost and weight, but it is understood that extension member 110 does not need to be hollow, it could for example, be partially and/or substantially solid. It is further understood that, although having a consistent shape and/or cross-section throughout may facilitate production and/or lower the cost of producing extension member 110, having a consistent shape and/or cross section is not a requirement for extension member 110. Alternatively, for example, only a portion of extension member proximal end 112 may interface with hitch 102 leaving the remainder of extension member 110 unconstrained by the shape and/or size of hitch 102. It is also understood that hitch 102 may be without an opening into which extension member proximal end 112 is inserted. Hitch 102 may be shaped and/or oriented differently than as illustrated in FIG. 1, including, but not limited to ball hitches of various sizes. It is even further understood that extension member 110 may interface with vehicle 101 at a point other than hitch 102. While hitch 102 may provide a convenient and structurally sufficient attachment point, other points of vehicle 101 may be utilized as attachment points, and extension member proximal end 112 may be correspondingly adapted to interface with any of those attachment points, which may include, but are not limited to, the vehicle frame, chassis, truck bed, or any other point.

As further illustrated in FIGS. 1 and 2, extension member distal end 114 is illustrated as a substantially hollow square tube that is attached to or integral with extension member 110 to define opening 114a. It is understood that extension member distal end 114 may be a square tube, but it may alternatively be a variety of shapes including, but not limited to: square, round, cylindrical, triangular, rectangular, hexagonal, octagonal, otherwise polygonal; or prismatic or any other shape; and it need not be tubular. Also, in this embodiment extension member distal end 114 is substantially hollow to accept transverse member 120 but it is understood that extension member distal end may be partially or substantially solid. While it may be desirable to have extension member 110 and extension member distal end 114 be of substantially the same metallic material and welded together, it is understood that a variety of attachment methods may be used to attach them, including, but not limited to, bolting, screwing, gluing or otherwise adhering, chemically bonding, using brackets or other mechanical attachment methods, or any other attachment method. It is further understood that extension member 110 and extension member distal end 114 may be made of a variety of materials and are not limited to metals, and that they need not be of the same material. A working height H of mounting plate 160 can be adjusted to accommodate a variety of desired vertical positions of mounted compressor 104. Extension member distal end 114 has, in the embodiment illustrated, four extension member apertures 116. Two of the extension member apertures 116 are located on a first side of extension member distal end 114 and the other two extension member apertures 116 are located on a second side of extension member distal end 114 that is diametrically opposed to the first side. The extension member apertures 116 can be aligned with transverse member apertures 126 located on transverse member 120. In this way, as described in more detail below, T-rod 117 may be inserted through extension member distal end 114 and through transverse member 120 to secure transverse member 120 vertically at the desired working height H relative to extension member distal end 114. It is further understood that, while FIG. 1 illustrates transverse member 120 being substantially perpendicular to, and thus vertical to, extension member 110, transverse member 120 need not be perpendicular to extension member 110 and could be angularly displaced in a variety of directions or orientations relative to extension member 110. It is even further understood that any number of extension member apertures 116 may be utilized, but two per side may be effectively resist unwanted rotation.

As shown in FIGS. 1-3A, transverse member 120 is shaped and sized to fit inside and be able to slide at least partially through extension member distal end 114. Each of the four sides of transverse member 120 have four transverse member apertures 126 that are sized, shaped, and located so that any two consecutive pairs of transverse member apertures 126 may align with the two pairs of extension member apertures 116 of extension member distal end 114, thereby allowing T-rods 117 to be inserted through both sets of apertures 116, 126, thus securing extension member 110 and transverse member 120 together. Each of the four sides, not including the top and bottom, of transverse member 120 is depicted having transverse member apertures 126. In this way, transverse member 120 may be rotated about transverse axis At and still be inserted into extension member distal end 114 and secured thereto by T-rods 117 to orient the mounted compressor 104 about transverse axis At as desired by the operator. It is understood that FIGS. 1 and 2 illustrate one embodiment allowing vertical and/or rotational adjustment of transverse member 120 relative to extension member 114. A variety of other mechanisms could be employed to allow vertical and/or rotational adjustability. Other examples of mechanisms that could be employed include, but are not limited to, hydraulics, pneumatics, electric motors or lifts, or a variety of mechanical devices, such as springs, gears, or ratchets, or any other type of mechanism. It is further understood that, while vertical and/or rotational adjustability may be beneficial, one or both is not required and transverse member 120 may be rigidly affixed to extension member 110 in a variety of ways including, but not limited to, using a solid piece of material incorporating both members 110, 120, welding, bolting, screwing, bracketing, gluing, adhering, chemically bonding, or any other type of attachment method. While FIG. 2 depicts transverse member 120 as a substantially hollow square tube, it is understood that it may be partially and/or substantially solid, and it may be of a variety of different shapes including, but not limited to: square, round, cylindrical, triangular, rectangular, hexagonal, octagonal, otherwise polygonal; or prismatic or any other shape; and it need not be tubular.

As shown in FIGS. 2-3C, lower pivot member 130 is attached to transverse member distal end 124 via a lower attachment plate 228. Lower attachment plate 228 may be welded to, or may be a formed as one solid piece of material with, transverse member distal end 124 and also welded to or otherwise attached to lower pivot member 130. Alternatively, lower attachment plate 228 may be formed as a solid piece of material with lower pivot member 130 and welded or otherwise attached to transverse member distal end 124. While it may be preferable to include lower attachment plate 128 to facilitate attachment of transverse member 120 to lower pivot member 130, or for any other reason, it is understood that transverse member 120 could be directly attached to, or formed as one solid piece with, lower pivot member 130 without including lower attachment plate 228. Lower pivot member 130 is depicted as a substantially U-shaped bracket with upwardly projecting lower first side flange 232 and lower second side flange 236. Lower first side flange 232 has two lower first side flange apertures 234p and 234a extending through lower first side flange 232 and lower second side flange 236 likewise has two second side flange apertures 238p and 238a extending through lower second side flange 236. Lower first and second side flanges 232, 236, respectively, extend laterally from the portion of the lower pivot member 130 that is connected to lower attachment plate 228. First and second side flange apertures 234p, 234a and 238p, 238a, respectively, are located a vertical distance from lower attachment plate 228.

Referring to FIGS. 1-3C, upper pivot member 140 is depicted as a substantially U-shaped bracket with a depending upper first side flange 142 and upper second side flange 246. Each of upper first and second side flanges 142, 246, respectively, have an upper first and second side flange pivot aperture 244p, 248p and a plurality of first and second side flange arc apertures 244a, 248a arranged in an arcuate pattern. Upper first side flange 142 and upper second side flange 246 are sufficiently separated such that each may be in overlapping engagement with lower first side flange 232 and lower second side flange 236. Specifically, lower first side flange 232 engages upper first side flanges 142. Further, lower second side flange 236 engages upper second side flange 246. Lower first and second side flange pivot apertures 234p, 238p are sized and located to be alignable with upper first and second side flange pivot apertures 244p, 248p, respectively. Thus, an operator may insert pivot rod 137p through pivot apertures 234p, 238p, 244p, 248p thereby pivotally securing upper pivot member 140 relative to lower pivot member 130 about pivoting axis Ap. In this way, an operator may use a locking mechanism formed by insertion of pivot rod 137p and arc rod 137a to lock upper pivot member 140 into a pivotal or angular position relative to lower pivot member 130. It is understood that this is merely one example of a locking mechanism that may be used, and that a variety of locking mechanisms may be used, including, but not limited to, ratchets, gears, mechanical devices, pneumatics, hydraulics, electronics, or any other mechanism. The operator may pivot upper pivot member 140 and mounted compressor 104 relative to lower pivot member 130 to a desired pivotal position about pivoting axis Ap, from a first position to a second position and subsequently secure upper and lower pivot members 140, 130 in that position by inserting arc rod 137a through co-aligning arc apertures 234a, 238a, 244a, and 248a. It is understood that any pivotal position may be the first position and any other pivotal position may be the second position. Pivot rod 137p and arc rod 137a may be laterally secured in place by inserting a cotter pin 139 or the like through either or both of the ends of pivot rod 137p and arc rod 137a.

As shown in FIGS. 3A, 3B, and 3C, upper pivot member 140 with mounted compressor 104 pivots relative to lower pivot member 130 in a variety of angular or pivotal positions each having an angular displacement $\alpha$. This embodiment contemplates orienting and/or securing upper pivot member 140 in a substantially horizontal position (shown in broken lines in FIG. 3A with a being zero degrees relative to transverse axis At), which is one possible first position. FIG. 3A shows one possible second position of upper pivot member 140 that is pivoted from the horizontal position approximately 45 degrees clockwise ($\alpha 1$) relative to transverse axis At. FIG. 3B shows another possible second position of upper pivot member 140 that is pivoted from the horizontal position approximately 90 degrees clockwise ($\alpha 2$) relative to transverse axis At. FIG. 3C shows yet another possible second position of upper pivot member 140 that is pivoted from the horizontal position approximately 135 degrees clockwise ($\alpha 3$) relative to transverse axis At. It is understood that a variety of angular displacements a may be a first position and that a variety of angular displacements a may be a second position, a first position may be counterclockwise from a second position or vice versa, and more than two positions may be utilized. It is further understood, although not shown, that upper pivot member 140 may be pivoted counterclockwise relative to transverse axis At. Further, while this embodiment is illustrated rotating upper pivot member 140 relative to transverse axis At in 45 degree increments, it is understood that virtually any angular displacement $\alpha$ of upper pivot member 140 relative to transverse axis At may be utilized by correspondingly re-arranging the location of upper first and second side flange arc apertures 244a, 248a. It may be desirable to locate each upper flange arc aperture 244a, 248a equidistantly from its corresponding pivot aperture 244p, 248p, respectively, so that each of upper first and second side flange arc apertures 244a, 248a creates an arcuate pattern with the respective pivot aperture 244p, 248p being the center point of the arc. This arcuate pattern may ensure that, while pivot rod 137p pivotally secures upper member 140 about pivoting axis Ap, any of upper first and second side flange arc apertures 244a, 248a may be made to align with lower first and second side flange arc apertures 234a (lower second side flange arc aperture not shown), thus allowing arc rod 137a to secure upper pivot member 140 and compressor 104 in the desired angular displacement $\alpha$. Alternatively, an arcuate slot or the like may be used to accommodate the angular rotation about pivot rod 137p or pivoting axis Ap by including the locking mechanism to secure the angular displacement, and to prevent undesired slipping of upper pivot member 140 relative to lower pivot member 130. It is also understood that many forms of pivoting devices may be used to achieve the pivoting action of pivot rod 137p and, further, that pivot rod 137p need not be removable as depicted in FIGS. 1-3C.

As shown in FIGS. 2-3C, mounting plate receiving member 250 is illustrated attached to upper pivot member 140. Mounting plate receiving member 250 may contain a bore or other cavity to receive attachment protrusion 262. In this embodiment, attachment protrusion 262 is rotatably secured to mounting plate receiving member 250 by a friction fit created by tightening threaded T-rod 155 into threaded attachment bore 254 to fix the rotational position of the mounting plate 160 with mounted compressor 104. In some embodiments, it may be preferable to have a substantially cylindrical bore within mounting plate receiving member 250 and a substantially cylindrical attachment protrusion 262 to allow for rotation R of attachment protrusion 262 about rotational axis Ar to a desired rotational position before securing attachment protrusion 262 in place. In this way, mounting plate 160 and compressor 104 may be rotated from a first rotational position to a second rotational position. It is understood that any rotational position about rotational axis Ar may be the first position, and any other rotational position about rotational axis Ar may be the second position. Attachment protrusion 262 is secured to mounting plate 160 so that mounting plate 160 is effectively secured to mounting plate receiving member 250 and consequently to upper pivot member 140. In this way, mounting plate 160 with mounted compressor 104 may be rotated about rotational axis Ar. Thus, an operator may use a locking mechanism formed by tightening T-rod 155 to lock mounting plate 160 into a rotational position relative to upper pivot member 140. It is understood that this is merely one example of a locking mechanism that may be used, and that a variety of locking mechanisms may be used, including, but not limited to, ratchets, gears, mechanical devices, pneumatics, hydraulics, electronics, or any other mechanism.

As shown more clearly in FIGS. 1 and 2, mounting plate 160 is illustrated having a top face 180 with a fixed aperture 282, first slot 184, second slot 186, and third slot 188. Fixed aperture 282 is sized to accept bolt 106 through foot 105 with minimal lateral movement, other than rotation, of foot 105 relative to top face 180, until one or more additional bolts 106 are attached. First slot 184 is illustrated extending linearly in a first direction and second slot 186 is illustrated extending linearly in a second direction substantially perpendicular to the first direction such that, if first slot 184 and second slot 186 were to be extended linearly in the first and second directions respectively, they would intersect at fixed aperture 282. Similarly, third slot 188 is illustrated as bisecting the angle created by first slot 184 and second slot 186. Similar to first slot 184 and second slot 184, third slot 188 is illustrated such that, if extended linearly, it would intersect first aperture 282. Thus, the geometric orientation of fixed aperture 282, first slot 184, second slot 186, and third slot 188 creates a universal mounting pattern on mounting plate 160 for accepting and securing to it a variety of compressors 104 via foot 105 that may have a variety of sizes of square bolt hole patterns. Securing all bolts 106 through foot 105 to top face 180 that is substantially flush with foot 105 aids in stabilizing compressor 104 while an operator inspects, tests, or manipulates compressor 104. In this embodiment, top face 180 is substantially flat to flushly mate to foot 105 of compressor 104. Top face 180 may be other than flat, if foot 105 is other than flat, to correspond to and/or flushly mate with foot 105. It is understood that, while foot 105 is illustrated having a substantially square bolt hole pattern, a variety of aperture and slot configurations may be used to accept virtually any shape of foot 105 including, but not limited to, rectangular, triangular, round, or any of a number of polygonal shapes, or any other shape, and that the corresponding aperture and slot configuration necessary to mount a desired compressor 104. It is further understood that more or less than four bolts 106, and/or more or less than all bolts 106, may be fastened. For example, if foot 105 includes four bolts 106, compressor mounting assembly 100 may still operate effectively with only 1, 2, or 3 bolts 106, or more than 4 bolts 106. It should be understood to one of ordinary skill in the art that a variety of attachment mechanisms may be used to secure compressor 104 to mounting plate 160.

In use, an operator may adjust working height H by vertically adjusting transverse member 120 along transverse axis At relative to extension member 110, for example, as described above. The operator may attach compressor mounting assembly 100 to hitch 102, for example, as described above. The operator may then place foot 105 of compressor 104 on top face 180 of mounting plate 160 in any desired pivotal position and secure compressor 104 to mounting plate aperture 282 and mounting plate slots 184, 186, 188 via bolts 106, thereby attaching compressor 104 to compressor mounting assembly 100. The operator may then remove arc rod 137a while pivot rod 137p is engaging upper pivot member 140 and lower pivot member 130, thereby allowing the operator to pivot compressor 104 from a first pivotal position to a second pivotal position about pivoting axis Ap as desired. Once compressor 104 is in a desired pivotal position, the operator may secure that pivotal position by inserting arc rod 137a through upper pivot member 140 and lower pivot member 130. The operator may cut compressor 104, for example with saw 109, by making a cut, loosening threaded T-rod 155, rotating compressor 104 about rotational axis Ar and then re-tightening threaded T-rod 155 to fix its rotational position, and making another cut in compressor 104. This process of cutting and rotating may be repeated as many times as necessary to make a cut or cuts sufficient to open compressor 104. In this way, an operator may avoid walking around compressor 104 to open it, and may instead make a continuous cut while the operator remains substantially stationary, which may be beneficial if compressor 104 has a thick casing or multiple casings that may necessitate multiple circumferential cuts to open it. Before opening or once a section of compressor 104 is cut off, the operator may pivot compressor 104 about pivoting axis Ap by removing arc rod 137a from upper pivot member 140 and/or lower pivot member 130 to allow tipping of compressor 104 so that oil and/or other fluids may be drained from it. The operator may then test, inspect, and/or manipulate the compressor as desired. It is understood that testing, inspecting, and/or manipulating the compressor may include, but is not limited to, visual/nonvisual examination and other sensory examination such as smell, electrical and/or chemical analysis, and dismantling/assembling the compressor. It is also understood that compressor mounting assembly 100 may be used in other ways as well, and the use discussed herein is merely one example of a use of compressor mounting assembly 100.

It is generally preferable that the structure disclosed herein be constructed of a rigid material, such as steel. More specifically, high carbon steel may have enhanced characteristics of structural rigidity. It is understood however, that other materials having sufficient rigidity may be used, including, but not limited to, low carbon steels, stainless steel, aluminum, virtually any other metal, wood, PVC, plastic, fiberglass, combinations thereof, and/or any other material of sufficient rigidity.

It is understood that while certain forms of the invention have been illustrated and described, it is not limited thereto except insofar as such limitations are included in the following claims and allowable functional equivalents thereof.

I claim:

1. A compressor mounting assembly for attachment to a vehicle, the compressor mounting assembly comprising:
   a framework having a first end and a second end with a lower U-shaped member pivotally engaging an upper U-shaped pivot member therebetween, said framework first end adapted to extend from a vehicle and said framework second end having a mounting plate being able to receive an HVAC compressor wherein each of said lower U-shaped member and said upper U-shaped pivot member have corresponding one or more pivot apertures defining a pivot axis and corresponding one or more arc apertures selectively orientating said upper U-shaped pivot member relative to said lower U-shaped member;
   wherein said mounting plate rotates about a rotational axis relative to said framework first end between a first rotational position and a second rotational position;
   wherein said mounting plate pivots about said pivoting axis between a first pivotal position and a second pivotal position relative to said framework first end; and
   wherein when said first end and said second end are assembled, said mounting plate rotates between said first rotational position and said second rotational position in each one of said first pivotal position and said second pivotal position of said mounting plate, and wherein a top surface of said mounting plate faces downwardly and away from the horizontal in at least one of said first or second pivotal positions.

2. The compressor mounting assembly of claim 1 wherein said pivoting axis is transverse to said rotational axis.

3. The compressor mounting assembly of claim 1 wherein said framework includes an adjustable height.

4. The compressor mounting assembly of claim 1 wherein said framework includes a locking mechanism fixedly securing said mounting plate in said at least one of said first and second pivotal positions.

5. The compressor mounting assembly of claim 1 wherein said framework includes a locking mechanism fixedly securing said second end mounting plate in said at least one of said first and second rotational positions.

6. The compressor mounting assembly of claim 1 wherein said second end mounting plate includes a universal mounting pattern.

7. The compressor mounting assembly of claim 1, wherein said framework includes a second rotational axis to rotate said second end of said framework relative to said first end of said framework when said first end is disassembled from said second end.

8. An adjustable compressor mounting apparatus, comprising:
   a framework having
      an extension member having a first end and a second end;
         wherein said first end is adapted to attach to a vehicle;
      a transverse member
         wherein said transverse member has a first end and a second end;
         wherein said transverse member first end attaches to said extension member second end;
         wherein said transverse member is at least partially transverse to said extension member;
   a lower member attachable to said transverse member second end, wherein said lower member includes one or more flanges with at least one pivot aperture and at least one arc aperture;
   an upper pivot member pivotally attachable to said lower member, wherein said upper pivot member includes one or more flanges with at least one pivot aperture and one or more arc apertures, wherein said one or more arc apertures are arranged in a substantially arcuate pattern about said at least one pivot aperture; wherein at least one pivot aperture of said lower member at least partially aligns with said at least one pivot aperture of said upper pivot member, and said at least one arc aperture of said lower member at least partially aligns with said one or more arc apertures of said upper pivot member to correspond to a first pivotal position and a second pivotal position;
   a mounting plate being adapted to receive an HVAC compressor;
   when said apparatus is assembled, said mounting plate with said HVAC compressor rotatably attachable to said upper pivot member about a rotational axis between a first rotational position and a second rotational position, wherein said mounting plate with said HVAC compressor and said upper pivot member pivots relative to said lower member between said first pivotal position and said second pivotal position, wherein said mounting plate downwardly pivots to said second pivotal position such that said rotational axis is positioned about 45 degrees below the horizontal thereby tipping said HVAC compressor downwardly and away from the horizontal to allow draining, and said mounting plate with said HVAC compressor rotates between said first rotational position and said second rotational position in each one of said first pivotal position and said second pivotal position.

9. The compressor mounting apparatus of claim 8, wherein said upper pivot member has a mounting plate receiving member that includes a substantially cylindrical bore, and said mounting plate has a substantially cylindrical protrusion;
   wherein said substantially cylindrical protrusion is at least partially insertable into said substantially cylindrical bore.

10. The compressor mounting apparatus of claim 8, wherein said extension member first end is at least partially adapted to attachably mate to a trailer hitch of said vehicle.

11. The compressor mounting apparatus of claim 8, wherein said transverse member slideably engages and is attachable to said extension member.

12. A method of using a compressor mounting assembly to test an HVAC compressor comprising the steps of:
   attaching said compressor mounting assembly to a vehicle, wherein said compressor mounting assembly includes a mounting plate adapted for attaching said HVAC compressor, wherein said HVAC compressor includes an outer housing;
   attaching said HVAC compressor to said mounting plate of said compressor mounting assembly;
   opening said HVAC compressor;
   testing said HVAC compressor; and rotating said HVAC compressor and said mounting plate about a rotational axis between a first rotational position and a second rotational position when said compressor mounting assembly is attached to said vehicle; and cutting said outer housing of said HVAC compressor in said first rotational position; and pivoting at least a portion of said compressor mounting assembly, said HVAC compressor, and said mounting plate about a pivoting axis defined by a lower member and an upper pivot member between a first pivotal position and a second pivotal position, and said lower member and said upper pivot member define one or more arc apertures, wherein said one or more arc apertures are arranged in a substantially arcuate pattern about said pivoting axis.

13. The method of claim 12 wherein the step of rotating said HVAC compressor and said mounting plate occurs in each of said first pivotal position and said second pivotal position.

14. The method of claim 12 further comprising the step of securing said compressor mounting assembly in one of said first and second pivotal positions.

15. The method of claim 12 further comprising the step of draining said HVAC compressor.

16. The method of claim 12 further comprising the step of adjusting the height of said compressor mounting assembly.

17. The method of claim 12 further comprising the step of cutting said outer housing of said HVAC compressor in said second rotational position.

18. The method of claim 12 wherein the step of cutting said outer housing of said HVAC compressor in said first rotational position includes cutting a circumferential portion of said outer housing.

19. The method of claim 18 further comprising the step of cutting 360 degrees about the circumference of said outer housing.

* * * * *